United States Patent [19]

Bostick et al.

[11] 3,855,184

[45] Dec. 17, 1974

[54] CROSSLINKING OF AROMATIC POLYMERS WITH ORGANIC POLYSULFONAZIDES

[76] Inventors: Edgar E. Bostick, 47 Saratoga Dr., Scotia, N.Y. 12302; Alfred R. Gilbert, 1394 Dean St., Schenectady, N.Y. 12309

[22] Filed: Aug. 1, 1973

[21] Appl. No.: 384,591

Related U.S. Application Data

[62] Division of Ser. No. 110,266, Jan. 27, 1971, Pat. No. 3,770,696.

[52] U.S. Cl.......... 260/79.3 R, 117/127, 117/128.4, 161/182, 161/192, 260/46.5, 260/47 XA, 260/49
[51] Int. Cl............................. C08f 7/02, C08f 27/06
[58] Field of Search .............................. 260/79.3 R

[56] References Cited
UNITED STATES PATENTS

| | | | |
|---|---|---|---|
| 3,058,944 | 10/1962 | Breslow | 260/41 |
| 3,507,829 | 4/1970 | Bostick | 260/47 |
| 3,583,939 | 6/1971 | Bostick | 260/46.5 |
| 3,740,376 | 6/1973 | Wolff | 260/73 R |

Primary Examiner—Christopher A. Henderson
Attorney, Agent, or Firm—William A. Teoli; Joseph T. Cohen; Jerome C. Aquillaro

[57] ABSTRACT

Aromatic polysulfonazides have been found to be effective for curing a wide variety of organic polymers having at least 20 mole percent of aromatic substitution, such as polystyrene, aromatic polycarbonates, and aromatic polyesters. The resulting cured products have a high degree of infusibility and insolubility.

1 Claim, No Drawings

CROSSLINKING OF AROMATIC POLYMERS WITH ORGANIC POLYSULFONAZIDES

This is a division of application Ser. No. 110,266, filed Jan. 27, 1971, now U.S. Pat. No. 3,770,696.

This invention is concerned with the curing of aromatic polymers by the use of a certain class of sulfonazides. More particularly, the invention is concerned with a composition of matter comprising an aromatic polymer containing an amount of an aromatic polysulfonazide sufficient to effect crosslinking of the polymer under the influence of heat.

Aromatic polymers such as polystyrene, polycarbonate resins, highly phenylated organopolysiloxanes, polyphenylene oxides, etc. are difficultly converted to the cured or crosslinked state whereby the polymer attains infusible and insoluble characteristics. The usual crosslinking agents, such as organic peroxides are not practical for the purpose of crosslinking these highly aromatic polymers because they tend to degrade the polymers causing loss in desirable properties. The usual cross-linking effect is of such a low order that the degree of infusibility and insolubility desired is often not attained by the usual free radical type curing agents of the type employed for curing aliphatic polymers, such as polyethylene.

Unexpectedly, we have discovered that a certain class of curing agents can be employed for effecting curing of highly aromatic polymers. The cured polymers thus obtained have a high degree of infusibility and insolubility greatly in excess of that obtainable by the use of, for instance, organic peroxides for the same purpose without the side effects of chain scission and degradation of polymer properties. The aromatic polysulfonazides employed in the practice of the present invention preferably contain at least two sulfonazide groups and may contain up to 10 or more non-adjacent sulfonazide groups. In all cases, the sulfonazide groups will be attached directly to the aromatic ring or rings. Exemplary aromatic polysulfonazides are 1,3-benzene bis(sulfonazide), 1-octyle-2,4,6-benzene tris(sulfonazide), 3,5-toluene bis(sulfonazide), 1,6-bis(4'-sulfonazidophenyl) hexane, 1-methoxy benzene-3,5-bis(sulfonazide) 4,4'-bis(octadecyl) biphenyl-3,5,3',5'-tetra(sulfonazide), 1-dodecylnaphthalene 3,6-bis(sulfonazide), etc.

A particular class of aromatic polysulfonazides which can be employed in the practice of the present invention are those corresponding to the general formula

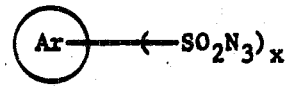

where Ar represents a polyvalent aromatic radical e.g., arylene (for instance, phenylene, biphenylene, naphthylene, etc.); aliphatic-substituted arylenes, i.e., alkarylene radicals (for instance, methyl, ethyl, dimethyl, butyl, etc., radicals can be present on the arylene nucleus; such as tolylene, ethylphenylene, etc.), and other analogous compounds, and $x$ is a whole number equal to at least 2, e.g., 2 to 6 or more.

Any aromatic polymer preferably containing at least 20 mole percent aromatic-substituted, e.g. phenylsubstituted groups, can be crosslinked by the process of this invention. This invention particularly applies to those polymers which have a high concentration of aromatic groups. Among such highly aromatic polymers may be mentioned, for example, polystyrene including those of varying molecular weights; thermoplastic polycarbonate resins, including the bis-phenol carbonate resins described in Angew. Chemie 68, 633 (1956), and in U.S. Pat. No. 2,950,266, issued Aug. 23, 1960; poly(phenylsilsesquioxanes) of the type disclosed and claimed in U.S. Pat. No. 3,017,386, issued Jan. 16, 1962; aromatic polyesters obtained by effecting reaction between a dihydroxy aromatic compound and a phthalic acid derivative such as terephthalic acid or isophthalic acid, examples of which are found recited in U.S. Pat. Nos. 3,036,990-992, issued May 29, 1962 and Nos. 3,160,602-605, issued Dec. 8, 1964; highly phenylated organopolysiloxanes, examples of which are described in U.S. Pat. No. 2,258,222, issued Oct. 7, 1941, etc., all of the above patents are assigned to the same assignee as the present invention. Other aromatic polymers are, for example, polyarylene oxide polymers discloses in the U.S. patent application of Allan S. Hay, Ser. No. 212,128, filed July 24, 1962 and assigned to the same assignee as the present invention; polyethers of polyaryl compounds such as those described in Belgium Pat. No. 650,476, published July 13, 1964, an example of which polymer is one composed of recurring units of the formula

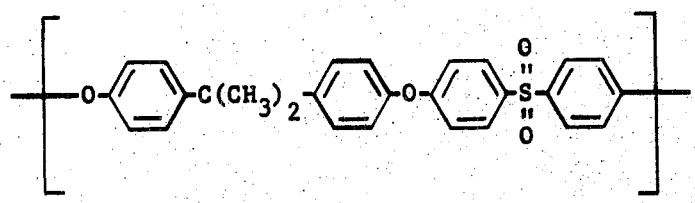

etc. By reference, the foregoing article and patents are made part of the disclosures of the present application.

The amount of aromatic polysulfonazide which is employed for crosslinking the above-described aromatic polymers is that necessary for effective conversion of the thermoplastic polymer to the substantially infusible, insoluble, crosslinked state. Based on the weight of the thermoplastic aromatic polymer, the aromatic polysulfonazide can comprise from 0.001 to as much as 5 or more percent, by weight. The actual amount of aromatic polysulfonazide required would depend upon such factors as the aromatic polymer involved, the particular aromatic polysulfonazide used, the application for which the crosslinked polymer is desired, etc.

Although we do not wish to be held to any theory whereby these aromatic polysulfonazides are able to crosslink the aromatic polymers, it is our belief that the crosslinking reaction proceeds by the following route, employing polystyrene and 1,3-benzene-bis-sulfonazide as specific examples:

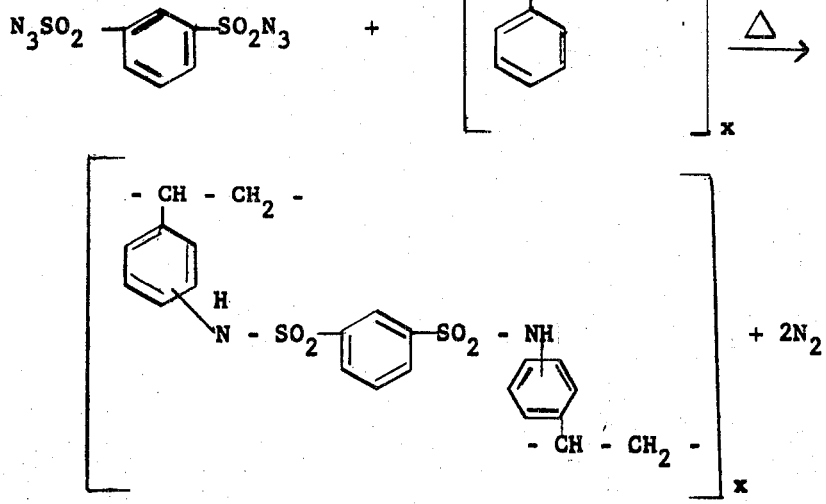

wherein $x$ is a whole number in excess of 1.

In the practice of the invention, it is only necessary to mix the aromatic polysulfonzide with the aromatic polymer employing usual means for the purpose, such as milling on differential rolls, the use of solvents for obtaining homogeneous solutions of polymer and the aromatic polysulfonazide, etc. Thereafter, the mixture of ingredients can be heated at temperatures ranging from about 125°– 300°C. or even higher for times of a few minutes to as much as several hours to remove solvent (if any) and to effect cross-linking of the aromatic polymers.

In addition to be crosslinking agent, other ingredients normally employed can also be incorporated including extenders, fillers, pigments, plasticizers, stabilizers, etc. Among the fillers which can be employed are, for instance, carbon blocks, calcium carbonate, iron oxide, finely divided silica, calcium silicate, alumina, etc. Good results are obtained as far as heat resistance and physical properties are concerned even in the absence of a filler.

The materials of this invention are useful in any application where tough, flexible coatings of film having good heat and solvent resistance are required for protecting insulating purposes. Thus, they are useful as insulating wire coatings, the wire being passed through a solution of the aromatic polymer containing the aromatic polysulfonazide, and then heated to drive off solvent, leaving a firm, solvent-resistant, flexible, high-temperature resistant film on the wire. The mixture of the aromatic polymer and the aromatic polysulfonazide dissolved in solvents can be used to coat various metallic surfaces or they can be cast on flat surfaces and the solvent evaporated and crosslinking induced by elevated temperatures to yield cohesive films which exhibit good heat resistance. These films can be used for many high temperature applications, for example, as slot liners, and as end-turn winding insulation in motors. High temperature laminates may be prepared by dipping inorganic porous materials, such as glass wool, glasscloth, asbestos cloth, polyethylene terephthalate film, etc., in solutions of our compositions, removing the solvent, superposing layers of the coated and/or impregnated materials, and pressing the assembly at elevated temperatures of about 200° to 350°C. at pressures ranging from about 5 to 5,000 psi. Such laminates may be in the form of panels used for electrical insulation, as insulating tapes, etc., and may also be used as nose cones for rockets and other projectiles which are subjected to high temperatures at supersonice speeds.

One can also mold canopies from the mixture of the aromatic polymer and the aromatic polysulfonazide for use on jet airplanes which are employed to protect the pilot when travelling at high speeds in which the friction of the air causes excessive increase in temperature. Mufflers and tailpipes of automobiles may be coated inside and out with solutions of the above-described compositions, the solvent evaporated and the films deposited thereon cured at elevated temperatures leaving behind heat-resistant and corrosion-resistant film. Ovens and ranges can be coated on the inside and the coatings again subjected to elevated temperatures to give heat-resistant surfaces which will also minimize the adhesion of many foods which may be inadvertently spilled on or come in contact with the treated oven surfaces.

In order that those skilled in the art may better understand how the present invention may be practiced, the following examples are given by way of illustration and not by way of limitation. All parts and percentages are by weight unless otherwise indicated. In the following cases, the aromatic polysulfonazide used was 1,3-benzene-bis-sulfonazide hereinafter identified as BMDSA.

EXAMPLE 1

In this example, solutions were made of 5 grams of thermoplastic polystyrene dissolved in 35 ml. methylene chloride. Various percentages of BMDSA were added and in each instance, the solution of the mixture of ingredients was cast on glass plates and air dried to produce films about 3 to 4 mils thick. The films were removed, residual solvent eliminated by air drying or by applying a vacuum, and thereafter the film was crosslinked by heating it in a press at a temperature of 175°C. for 35 minutes under a pressure of about 500 psi. Employed for this example were various concentrations of BMDSA equal to 0.2%, 0.4%, 0.8%, and 1.6%, based on the weight of the polystyrene. In each instance, a crosslinked, infusible and insoluble polymer was obtained which had higher heat distortion temperatures than the base resin.

EXAMPLE 2

In this example, fusible organopolysiloxane copolymers composed of from 20 to 25 mole percent diphenylsiloxy units and from 75 to 80 mole percent dimethylsiloxy units were prepared and the polymers were blended with 1%, by weight, BMDSA, based on the weight of the organopolysiloxane. In each instance, the resulting mixture was heated in a press at 175°C. at 5,000 psi. for 30 minutes and thereafter post-heated in an air-circulating oven at 175°C. for 2 hours to complete the crosslinking cycle. As a control, some of the above-described organopolysiloxanes were crosslinked with di-(α- cumyl) peroxide (dicup) employing the same procedure as above. The following Table I describes the molar concentration of the dimethylsiloxy and diphenylsiloxy units as well as the particular crosslinking agent. The table additionally shows the tensile strengths and percents elongation of the various cured polymers both at room temperature and when measured at 125°C.

EXAMPLE 3

When about 2%, by weight, of BMDSA was incorporated in a thermoplastic poly-2,6-diphenyl-1,4-phenylene oxide (which can be prepared by the method described in the aforementioned Hay application, Ser. No. 212,128) and the mixture of ingredients heated at elevated temperatures similarly as in Examples 1 and 2, a crosslinked, substantially infusible, insoluble polymer was obtained. A similar crosslinked polymer was obtained when a thermoplastic poly-2,6-dimethyl-1,4-phenylene oxide polymer was used in the same manner with the BMDSA.

EXAMPLE 4

In this example, about 2 parts of BMDSA and 100 parts of the polyphenylsilsesquioxane described in the above-mentioned U.S. Pat. No. 3,017,386, were dissolved in benzene, a film cast and dried under nitrogen and the film heated for about 30 minutes at about 175°C. to obtain an infusible, insoluble polymer.

EXAMPLE 5

About 2 parts BMDSA was mixed with 100 parts of a thermoplastic bisphenol-A polycarbonate resin, and the mixture of ingredients heated similarly as in Examples 1 and 2. A crosslinked product insoluble in solvents such as benzene, methylene chloride, and acetone was obtained.

TABLE I

| Organopolysiloxane Mole Percent [$(CH_3)_2SiO$] | [$(C_6H_5)_2SiO$] | Cross-Linking Agent | Tensile, psi Room Temp. | 125°C. | Percent Elongation Room Temp. | 125°C. |
|---|---|---|---|---|---|---|
| 80 | 20 | Dicup | 420 | Less than 100 | 152 | 111 |
| 80 | 20 | BMDSA | 560 | 390 | 270 | 200 |
| 75 | 25 | BMDSA | 575 | 402 | 275 | 302 |

What we claim as new and desire to secure by Letters Patent of the United States is:

1. A composition of matter comprising (a) polystyrene and (b) an amount of aromatic polysulfonazide sufficient to effect crosslinking of (a).

* * * * *